United States Patent [19]

Stein et al.

[11] Patent Number: 4,888,382
[45] Date of Patent: Dec. 19, 1989

[54] SHELF STABLE SILICONE CAULKING MATERIALS

[75] Inventors: Judith Stein, Schenectady; Tracey M. Leonard, Clifton Park, both of N.Y.

[73] Assignee: General Electric Company, Schenectady, N.Y.

[21] Appl. No.: 200,477

[22] Filed: May 31, 1988

[51] Int. Cl.$^4$ .................... C08K 3/26; C08G 77/06
[52] U.S. Cl. ........................... 524/788; 524/588; 524/837; 524/860; 524/863; 528/18; 528/34; 528/38
[58] Field of Search ............. 524/588, 860, 863, 837, 524/788; 528/34, 18, 38

[56] References Cited

U.S. PATENT DOCUMENTS

| | | | |
|---|---|---|---|
| 3,817,894 | 6/1974 | Butler et al. | 524/588 |
| 4,221,688 | 9/1980 | Johnson et al. | 260/39.3 M |
| 4,427,811 | 1/1984 | Elias et al. | 524/96 |
| 4,590,220 | 5/1986 | Bauman et al. | 521/68 |
| 4,608,412 | 8/1986 | Freiberg | 524/724 |

*Primary Examiner*—John C. Bleutge
*Assistant Examiner*—R. Dean, Jr.
*Attorney, Agent, or Firm*—William A. Teoli

[57] ABSTRACT

Curable silicon caulking compositions are provided having improved shelf stability as a result of the use of a neopentyl orthosilicate.

4 Claims, No Drawings

SHELF STABLE SILICONE CAULKING MATERIALS

BACKGROUND OF THE INVENTION

The present invention relates to silicone caulking compositions resulting from the incorporation of a nonsiliceous filler, such as calcium carbonate, into a silicone emulsion and the employment of an orthosilicate stabilizer, such as a neopentylorthosilicate.

Prior to the present invention, as shown by M. G. Elias et al., U.S. Patent 4,427,811, anionically stabilized silicone emulsion were often aged for several weeks prior to the addition of a nonsiliceous filler. However, the resulting filled caulk showed a loss in properties if allowed to agge before water was removed. A.E. Freiberg, U.S. Patent 4,608,412, found that if a silicone caulk, consisting of an anionically stabilized silanol-terminated polymer, dialkyltindicarboxylate, an alkylorthosiicate, and an inert filler, also incorporate 2-amino-2-methyl-1-propanol, the resulting caulking resisted gelation upon aging.

The present invention is based on the discovery that shelf stable curable silicone caulking materials also can be prepared by initially anionically polymerization agent as a surfactant, to produce an aqueous emulsion. The pH of the emulsion is adjusted to a range of about 9-11, and combined with a nonsiliceous filler, a tin catalyst, a cross-linking agent, and an effective amount of a cross-linker as defined hereinafter, resulting from the reaction of neopentyl alcohol, and tetraalkoxysilane.

STATEMENT OF THE INVENTION

There is provided by the present invention, a silicone caulking composition comprising by weight, (A) 100 parts of a base mixture consisting essentially of an aqueous emulsion having a pH of from 9 to 11, and a solids concentration of about 30% to 70% by weight, consisting essentially of a silanol-terminated polydiorganosiloxane stabilized by an anionic surfactant, (B) up to 50 parts of nonsiliceous filler, (C) 0.3 to 2 parts and preferably 0.4 to 0.8 part of tin catalyst, (D) 0.1 to 5 parts and preferably 0.5 to 1 part of an alkyl silicate neopentylalcohol reaction product having the formula,

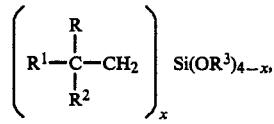

where R, $R^1$, $R^2$, and $R^3$ are selected from the same or different $C_{(1-8)}$ alkyl radicals, and x is an integer equal to 1 to 3 inclusive.

The silanol-terminated polydiorganosiloxanes which can be used in the practice of the present invention to make the shelf stable caulking compositions can be made by equilibrating cyclic polydiorganosiloxane, preferably octamethylcyclotetrasiloxane, in an aqueous media in the presence of an anionic catalyst, such as dodecylbenzene-sulfonic acid. Procedures for making the silanol-terminated polydiorganosiloxane is shown by D.E. Findlay et al., U.S. Pat. No. 3,294,725. In addition to methyl radicals, the organo radicals can include phenyl radicals, vinyl radicals, trifluoropropyl radicals, cyanoethyl radicals, or cyanopropyl radicals, and mixtures thereof. Geneally, anh monovalent hydrocarbon radicals, such as a $C_{(1-13)}$ hydrocarbon radical will provide for effective results, while preferably the silanol-terminated polydiorganosiloxane is a silanol-terminated polydimethylsiloxane having a molecular weight in the range of from about 30,000 to 60,000.

Suitable anionic catalysts which can be used to polymerize the cyclic polydiorganosiloxane are, for example, dodecylbenzene sulfonic acid. Additional anionic polymerization catalysts are shown by Findlay et al., U.S. Pat. No. 3,294,725.

After forming the aqueous emulsion using the anionic catalyst, the pH of the mixture can be adjusted with a mateial, such as triethylamine, to a pH in the range of from about 9 to 11.

Nonsiliceous fillers which can be used in the caulking compositions of the present invention are, for example, titaniumdioxide, aluminumoxide, carbon black, while the preferred filler is calcium carbonate.

Blending of the nonsiliceous filler with the aqueous emulsion can be readily achieved by standard procedures.

In order that those skilled in the art will be better able to practice the present invention, the following example is given by way of illustration and not by way of limitation. All parts are by weight.

EXAMPLE

A silicone emulsion having 50% solids was prepared in accordance with the teaching of Findlay et al., U.S. Pat. No. 3,294,725, by ionically polymerizing octamethylcyclotetrasiloxane with dodecylbenzenesulfonic acid in the form of an aqueous emulsion followed by a pH adjustment to 9-11 using triethylamine. A base formulation was rpepared by mixing the resulting aqueous emulsion of silanol-terminated polydimethylsiloxane having a molecular weight of about 50,000 with treated precipitated calcium carbonate. There was agitated in a Ross double planetary mixer for 30-60 minutes, 1500 grms of aqueous silicone emulsion with 640 grams of the calcium carbonate. The resulting base formulation was degassed, passed through a high shear Semco mixer for 15 minutes, and then dispensed into anaerobically-sealed cartridges.

Orthosilicate reaction product (Silicate A) was prepared by refluxing and stirring under a nitrogen atmosphere, a mixture of 30 grams of 2,2-aminomethyl-propanol and 21 grams of tetraoethosilicate. GC-MS analysis showed the major product was Si-OCH$_2$C(CH$_3$)$_3$NH$_2$)$_4$.

Orthosilicate reaction product (Silicate B) was prepared in accordance with the practice of the invention by allowing a mixture of 30 grams of neopentyl alcohol and 20 grams of tetraethylorthosilicate to reflux for two hours with stirring under a nitrogen atmosphere.

volatiles within were removed in vacuum from the resulting mixture. GC-MS analysis of the resulting product showed that three-product species were obtained as (neopentyoxy)Si(ethoxy)$_3$, (neopentoxy)$_2$Si(ethoxy)$_2$, and (enopentoxy)$_3$Si(ethoxy) with the disubstituted product as the major component.

There was injected into the above anaerobically-sealed cartridges, per 100 grams of the above base formulation, a catalyst mixture in grams as follows where "tin catalyst" is dibutyltin dilaurate (ee% aqueous), and "MTMS" is methyltrimethoxysilane:

|             | 1   | 2   | 3   |
|-------------|-----|-----|-----|
| Tin Catalyst | 1.7 | 1.7 | 1.7 |
| Si(OEt)₄    | 1.0 | —   | —   |
| Silicate A  | —   | 1.1 | —   |
| Silicate B  | —   | —   | 1.7 |
| MTMS        | —   | —   | —   |

The resulting anaerobically-sealed cartridges containing catalyzed base formulation were then thoroughly mixed using a Semkit mixer. The various cartridges charged with catalyzed base formulation were then all.owed to cure for one week prior to tensile property measurements, and a second series of cartridges were aged for two additional weeks in the cartridge prior to cure for one week and property measurement. Tensile properties were measured in accordance with ASTM standard D412. The following results were obtained where Shore A is hardness, and the data in () refers to the properties obtained after a two-week aging period in the cartridge and a one-week cure period:

|                  | Control* | A        | B        |
|------------------|----------|----------|----------|
| Shore A          | —        | 18(14)   | 31(27)   |
| Stress @ 50% strain | —     | 39(31)   | 58(47)   |
| TS (psi)         | —        | 82(71)   | 214(164) |
| Strain at break (%) | —     | 343(394) | 517(497) |

*Gelled in Semkit tube.
The data in parenthesis refer to the properties obtained after a two-week aging period in the cartridge and a one-week period after cure.

The above results show that caulking materials formulated with the neopentylalcohol reaction product (Silicate B) was superior to caulk containing 2,2-aminomethylpropanel (Silicate A). However, both caulks exhibited excellent shelf stability against gelation upon aging as compared to caulk having unmodified ethyl silicate.

Although the above example is directed to only a few of the very many variables which can be used in making the caulking compositions of the present invention, it should be understood that the caulking compositiohns of the present invention can be made by using a much broader variety of silanol-terminated polydiorganosiloxane, cross-linking agent, and nonsiliceous filler as discussed in the specification preceding this example.

What is claimed and sought to be protected by Letters Patent of the United States is as follows:

1. Silicone caulking composition consisting essentially of by weight
   (A) 100 parts of a base mixture consisting essentially of an aqueous emulsion having a pH of from 9 to 11, and a solids concentration of 30% to 70% by weight, consisting essentially of a silanol-terminated polydiorganosiloxane stabilized by an anionic surfactant,
   (B) up to 50 parts of a nonsiliceous filler,
   (C) 0.3 to 2 parts of a tin catalyst,
   (D) 0.1 to 5 parts of a reaction product of an alkyl silicate and neopentylalcohol.

2. A silicone caulking composition in accordance with claim 1, where (D) is a reaction product of ethylorthosilicate and neopentylalcohol.

3. A silicone caulking composition in accordance with claim 1, where the nonsiliceous filler is calcium carbonate.

4. A silicone caulking composition in accordance with claim 1, where the tin catalyst is dibutyltin dilaurate.

* * * * *